US008976218B2

(12) United States Patent
Thorson et al.

(10) Patent No.: US 8,976,218 B2
(45) Date of Patent: Mar. 10, 2015

(54) APPARATUS FOR PROVIDING FEEDBACK ON NONVERBAL CUES OF VIDEO CONFERENCE PARTICIPANTS

(75) Inventors: Dean E. Thorson, Grayslake, IL (US); William P. Alberth, Prairie Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 335 days.

(21) Appl. No.: 13/169,512

(22) Filed: Jun. 27, 2011

(65) Prior Publication Data
US 2012/0327180 A1 Dec. 27, 2012

(51) Int. Cl.
H04N 7/14 (2006.01)

(52) U.S. Cl.
USPC .................................. 348/14.03; 348/14.08

(58) Field of Classification Search
USPC ............... 379/93.21, 158, 202.01; 348/14.01, 348/14.02, 14.03, 14.08
See application file for complete search history.

(56) References Cited

U.S. PATENT DOCUMENTS

| 6,205,716 | B1 | 3/2001 | Peltz |
| 6,304,648 | B1 * | 10/2001 | Chang ...................... 379/202.01 |
| 6,606,744 | B1 | 8/2003 | Mikurak |
| 6,629,081 | B1 | 9/2003 | Cornelius et al. |
| 6,671,818 | B1 | 12/2003 | Mikurak |
| 6,688,891 | B1 | 2/2004 | Sanford |
| 6,763,390 | B1 | 7/2004 | Kovacevic et al. |
| 6,778,533 | B1 | 8/2004 | Kovacevic et al. |
| 6,785,336 | B1 | 8/2004 | Kovacevic et al. |
| 6,804,266 | B1 | 10/2004 | Kovacevic et al. |
| 6,850,252 | B1 | 2/2005 | Hoffberg |
| 6,885,680 | B1 | 4/2005 | Kovacevic et al. |
| 6,988,238 | B1 | 1/2006 | Kovacevic et al. |
| 6,999,424 | B1 | 2/2006 | Kovacevic et al. |
| 7,069,234 | B1 | 6/2006 | Cornelius et al. |
| 7,087,015 | B1 | 8/2006 | Comrie et al. |
| 7,113,546 | B1 | 9/2006 | Kovacevic et al. |
| 7,124,101 | B1 | 10/2006 | Mikurak |
| 7,167,844 | B1 | 1/2007 | Leong et al. |

(Continued)

FOREIGN PATENT DOCUMENTS

| EP | 1381185 A1 | 1/2004 |
| WO | 0130231 A2 | 5/2001 |

(Continued)

OTHER PUBLICATIONS

Patent Cooperation Treaty, International Search Report and Written Opinion of the International Searching Authority for International Application No. PCT/US2012/042011, Nov. 21, 2012, 11 pages.

*Primary Examiner* — Olisa Anwah
(74) *Attorney, Agent, or Firm* — Shumaker & Sieffert, P.A.

(57) ABSTRACT

An electronic device is communicatively coupled to at least one video camera during a video conference, and also includes a touchscreen display having video conference participant representations displayed on the touchscreen display. A haptics feedback system is integrated into the touchscreen display and is responsive to a user touching the video conference participant representations displayed on the touchscreen display. A speech-to-text controller converts video conference participant's speech into text and creates an identification tag for each video conference participant. In addition, an ongoing commentary controller provides feedback on non-verbal cues about the video conference participants.

13 Claims, 5 Drawing Sheets

(56) References Cited

U.S. PATENT DOCUMENTS

| | | | |
|---|---|---|---|
| 7,185,054 B1 * | 2/2007 | Ludwig et al. ............... 709/204 |
| 7,266,189 B1 * | 9/2007 | Day ........................ 379/202.01 |
| 7,610,233 B1 | 10/2009 | Leong et al. |
| 7,716,077 B1 | 5/2010 | Mikurak |
| 8,311,200 B2 * | 11/2012 | Kang ...................... 379/202.01 |
| 8,421,840 B2 * | 4/2013 | Eleftheriadis et al. ..... 348/14.08 |
| 2002/0032875 A1 | 3/2002 | Kashani |
| 2002/0078459 A1 | 6/2002 | McKay |
| 2003/0085929 A1 | 5/2003 | Huber et al. |
| 2003/0216831 A1 | 11/2003 | Hart et al. |
| 2004/0064351 A1 | 4/2004 | Mikurak |
| 2004/0130442 A1 | 7/2004 | Breed et al. |
| 2004/0246331 A1 * | 12/2004 | Caspi et al. ................. 348/14.08 |
| 2005/0069852 A1 | 3/2005 | Janakiraman et al. |
| 2005/0131744 A1 | 6/2005 | Brown et al. |
| 2005/0184867 A1 | 8/2005 | Osann, Jr. |
| 2005/0235032 A1 | 10/2005 | Mason, III |
| 2006/0164230 A1 | 7/2006 | DeWind et al. |
| 2006/0178918 A1 | 8/2006 | Mikurak |
| 2006/0248210 A1 * | 11/2006 | Kenoyer ....................... 709/231 |
| 2007/0171091 A1 | 7/2007 | Nisenboim et al. |
| 2007/0186002 A1 | 8/2007 | Campbell et al. |
| 2007/0265533 A1 | 11/2007 | Tran |
| 2007/0273504 A1 | 11/2007 | Tran |
| 2007/0276270 A1 | 11/2007 | Tran |
| 2007/0294263 A1 | 12/2007 | Punj et al. |
| 2008/0004904 A1 | 1/2008 | Tran |
| 2008/0017235 A1 | 1/2008 | Chen et al. |
| 2008/0032270 A1 | 2/2008 | Katz et al. |
| 2008/0062965 A1 | 3/2008 | Silva et al. |
| 2008/0243005 A1 | 10/2008 | Jung et al. |
| 2009/0088143 A1 | 4/2009 | Kim et al. |
| 2009/0112617 A1 | 4/2009 | Jung et al. |
| 2009/0112621 A1 | 4/2009 | Jung et al. |
| 2009/0119154 A1 | 5/2009 | Jung et al. |
| 2009/0132275 A1 | 5/2009 | Jung et al. |
| 2009/0140887 A1 | 6/2009 | Breed et al. |
| 2010/0031169 A1 | 2/2010 | Jang et al. |
| 2010/0145506 A1 | 6/2010 | Waugh et al. |
| 2010/0185064 A1 | 7/2010 | Bandic et al. |
| 2010/0241432 A1 * | 9/2010 | Michaelis ..................... 704/260 |
| 2010/0253689 A1 * | 10/2010 | Dinicola et al. ............... 345/467 |
| 2010/0257462 A1 * | 10/2010 | Barrett et al. ................. 715/756 |
| 2010/0283626 A1 | 11/2010 | Breed |
| 2010/0315482 A1 * | 12/2010 | Rosenfeld et al. ......... 348/14.08 |
| 2010/0315905 A1 | 12/2010 | Lee et al. |
| 2011/0069140 A1 * | 3/2011 | Ortel .......................... 348/14.08 |
| 2011/0093273 A1 * | 4/2011 | Lee et al. ..................... 704/270 |
| 2011/0238753 A1 | 9/2011 | Lueth et al. .................. 709/204 |
| 2011/0254912 A1 * | 10/2011 | Mock et al. ................. 348/14.03 |
| 2012/0053936 A1 * | 3/2012 | Marvit ......................... 704/235 |
| 2012/0092438 A1 * | 4/2012 | Guzman Suarez et al. ........................ 348/14.03 |

FOREIGN PATENT DOCUMENTS

| | | |
|---|---|---|
| WO | 0139028 A2 | 5/2001 |
| WO | 0139029 A2 | 5/2001 |
| WO | 0249311 A2 | 6/2002 |
| WO | 2007081518 A2 | 7/2007 |
| WO | 2007081519 A2 | 7/2007 |

\* cited by examiner

VIDEO CONFERENCE SETUP
CAMERA CAPTURES IMAGE OF LOCAL ROOM AND PARTICIPANTS
LOCAL AND REMOTE VIDEO STREAMS SENT TO TABLET OF
VISUALLY CHALLENGED PARTICIPANT

APPARATUS FOR PROVIDING FEEDBACK ON NONVERBAL CUES OF VIDEO CONFERENCE PARTICIPANTS

FIELD OF THE DISCLOSURE

The present disclosure relates generally to video conferencing and more particularly to communicating non-verbal cues from a video conference to impaired attendees.

BACKGROUND

Persons having limited sight are disadvantaged in a video conference because much information may not be communicated to them, for example, knowing whether a participant looks tired, or is nodding their acceptance of the presented information.

Accordingly, there is a need for an apparatus that provides feedback on nonverbal cues of video conference participants to impaired attendees.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
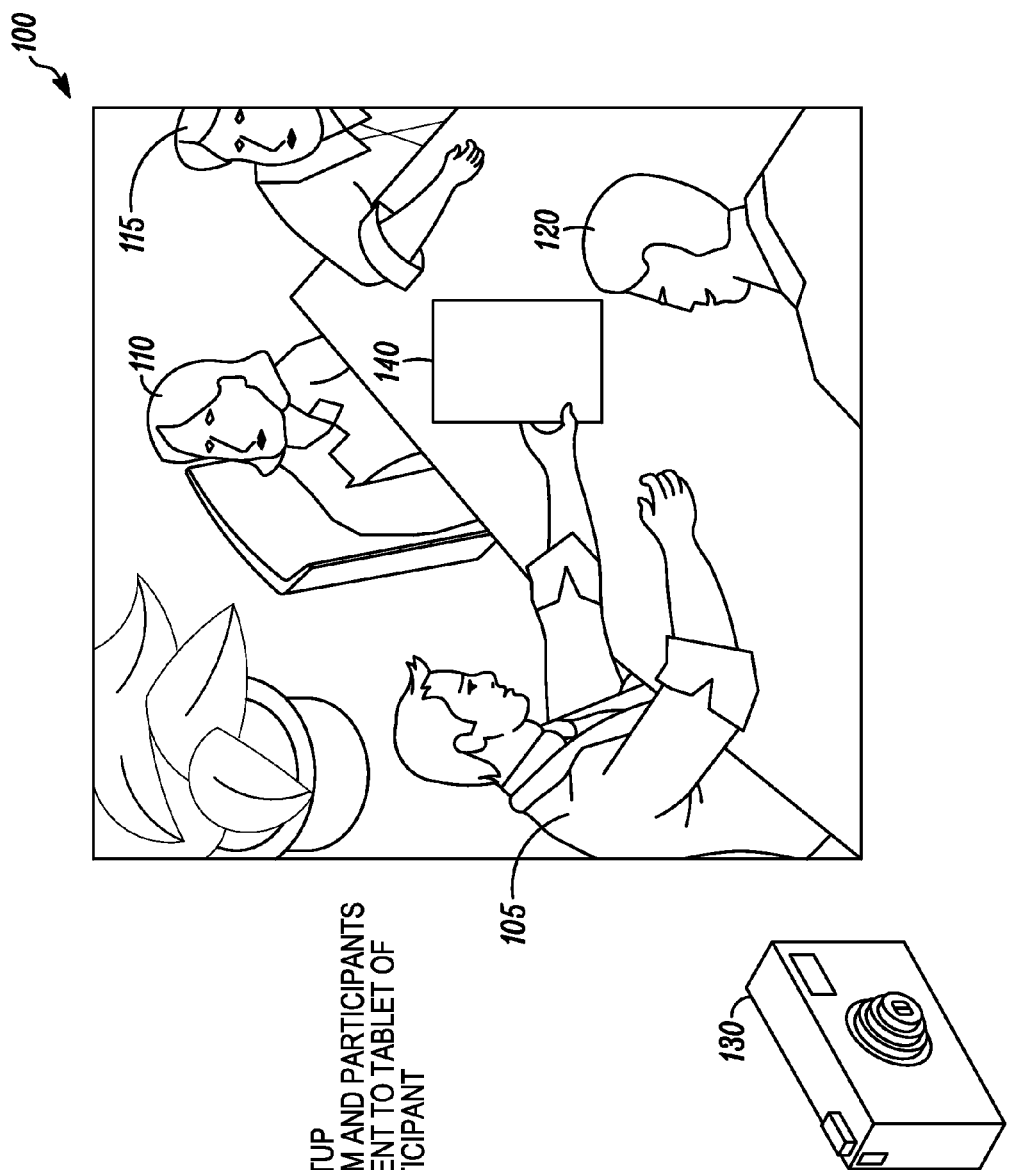
FIG. 1 is an exemplary pictorial illustration of local participants in a video conference setting.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An electronic device is communicatively coupled to at least one video camera during a video conference, and also includes a touchscreen display having video conference participant representations displayed on the touchscreen display. A haptics feedback system is integrated into the touchscreen display and is responsive to a user touching the video conference participant representations displayed on the touchscreen display. A speech-to-text controller converts video conference participant's speech into text and creates an identification tag for each video conference participant. In addition, an ongoing commentary controller provides feedback on nonverbal cues about the video conference participants.

FIG. 1 shows an exemplary pictorial illustration of local participants in a video conference setting 100. Local video conference participants may be in attendance to view and hear a presentation. The term "local" is with respect to a reference point associated with video conference setup. Likewise, remote video conference participants can be in attendance via a communication network to view and hear a presentation. In video conference setting 100, local participants (herein after termed: "lp") include a first male lp 105 displaying a presentation or document 140; a female lp 110, a second male lp 115 at far end of a table; and a third male lp 120 seated across from first male lp 105. A camera 130 is communicatively coupled to the video conference's communication network and captures video images and audio of the local participants and the room in which the video conference is being held. The captured video can be streamed to remote video conference participants. It is envisioned that there may be two groups of video conference participants at each end of a video stream and each group is local to its reference point.

Figure 2:
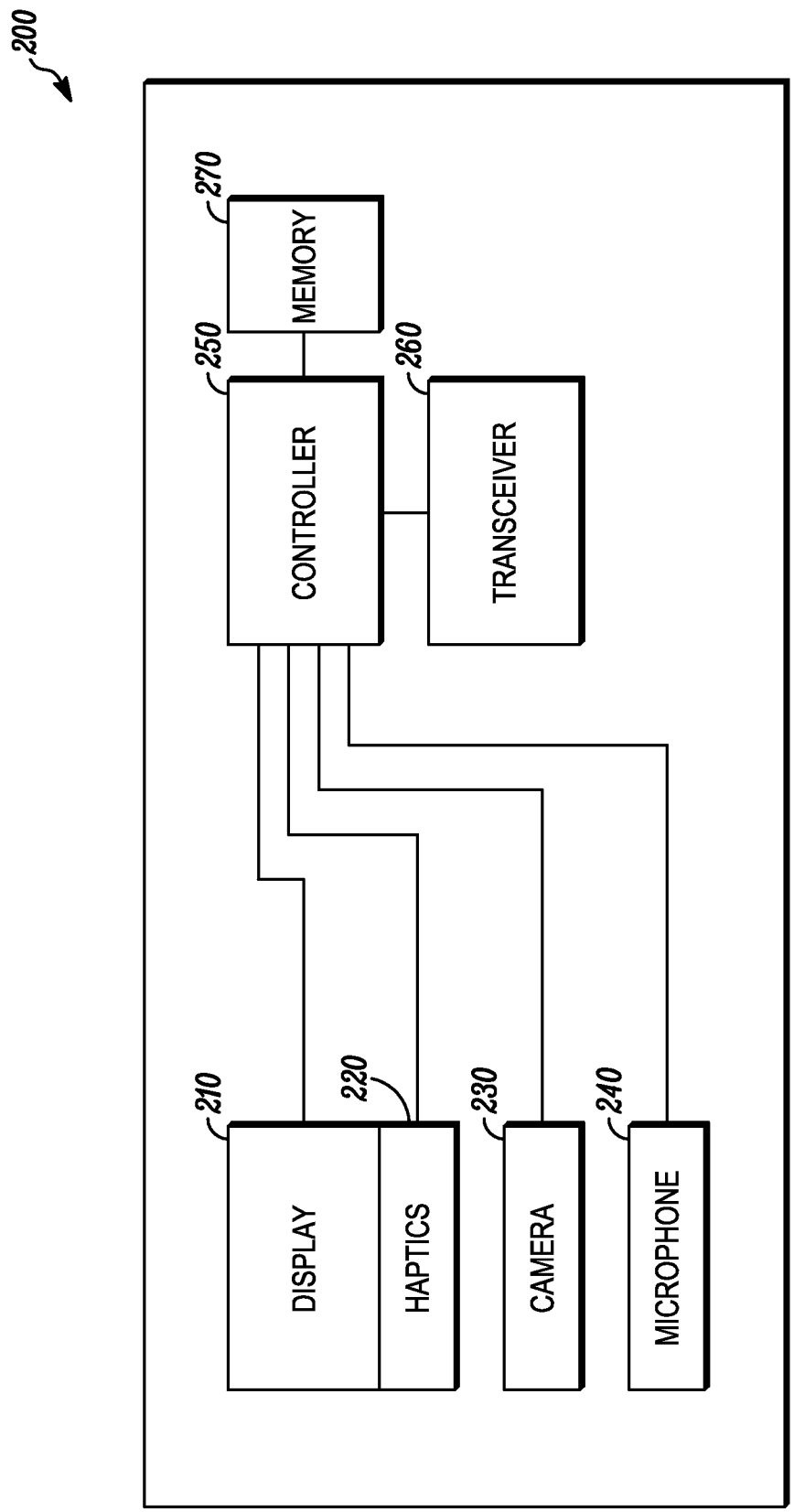
FIG. 2 is an exemplary block diagram of electronic system employed in a mobile computing device.

FIG. 2 shows an exemplary block diagram of electronic system employed in a mobile computing device 200 for receiving the streamed video from camera 130 in FIG. 1. Mobile computing device 200 includes a display 210 having an integrated haptics feedback system 220; a camera 230; a microphone 240; and a controller 250 electronically and communicatively coupled to display 210, haptics feedback system 220, camera 230, and microphone 240. Controller 250 can be comprised of separate, but linked controllers such as a speech-to-text controller and an ongoing commentary controller. A transceiver 260 is also electronically and communicatively coupled to controller 250 for receiving and transmitting data. Data can include image processing data, metadata, audio data, user input data, and communication data (e.g., Braille, texting, email), for example. Memory 270 can store the data either permanently or temporarily and is electronically and communicatively coupled to controller 250.

Functions in controller 250 can include a speech-to-text function that convert video conference participants' speech into text and creates an identification tag for each video conference participant. Other functions may include an ongoing commentary controller that provides feedback on non-verbal cues about the video conference participants. Moreover, controller 250 can prioritize the non-verbal cues feedback to avoid unnecessary or unwanted feedback, such as a participant doing excessive scratching of a body part or a participant blowing her nose several times throughout the video conference.

Figure 3:
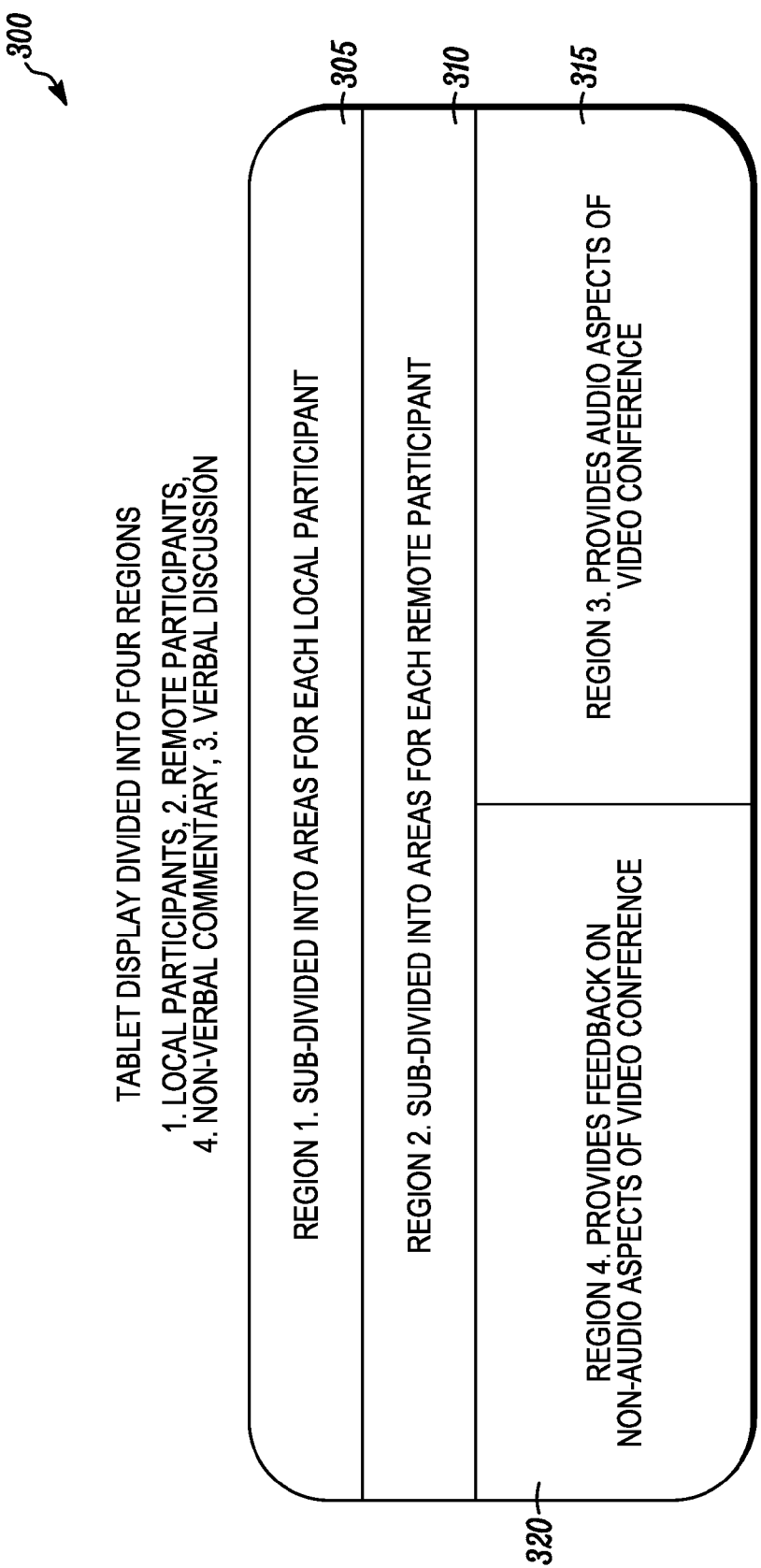
FIG. 3 is an exemplary schematic of a partitioned display of a mobile computing device.

FIG. 3 shows an exemplary schematic of a partitioned display 300 of a mobile computing device 200 (shown in FIG. 2). Mobile computing device 200 can be, for example, a tablet computer, a smartphone, a personal digital assistance, a gaming device, or an image capturing device. Partitioned display 300 can be divided into four regions, but can be contemplatively partitioned in less than or more than four regions. Region 305 displays local video conference participants or representations of local participants (i.e., icons, or avatars) and information about local participants, including title, gender, stature, pro/con/neutral position relative to presentation materials, etc. Region 310 displays remote video conference participants or representations of remote participants (i.e., icons, or avatars) and information about remote paticipants, including title, gender, statue, pro/con/neutral position relative to presentation materials, etc about remote participants. Region 315 of partitioned display 300 provides audio information from the video conference, including ambient audio, video conference speakers' speech, and audio associated with any presentation, such as Microsoft's Powerpoint™ audio. Region 320 provides feedback on non-audio information from the video conference, including non-verbal cues associate with each local video conference participant, room décor, external weather information, and presentation or document imaging, for example. These described regions can be altered and may change dynamically based on a user's personal aesthetic appreciation or need for specific information.

Notably, a user may employ a touchscreen on mobile computing device 200 to touch a specific region for receipt of feedback via at least one of the human senses, i.e., touch, smell, sight, taste, or audio for example. For example, feedback information may be passed in Braille format, or in a large text format, or in an audio format via headphones or external speakers.

Regions 305 and 310 can provide feedback about local and remote video conference participants, respectively during the video conference and also pre-video conference (warm-up and introductions) and post-video conference (wrap-up and side chatter about what was just discussed or seen). Such feedback can include participant's physical attire or dress, participant's actions, participant's facial features and dynamic facial expressions, participant's body language, for example.

Region 315 provides audio feedback, including which video conference participant is speaking and the content of the speech, for example. The format of the feedback can also either be in Braille, large format text, or headset driven audio.

Touching region 320 will provide a user with specific feedback on non-verbal cues of the video conference participants, especially those captured by camera 130 in the local video conference setting 100 as seen in FIG. 1. The non-verbal cues can include facial expressions, body language dynamics, and hand motions all in response to the information being communicated within the video conference, whether the information is directly associated with the presentation or discussion or purpose of the video conference or is only tangentially associated or is not associated at all with the video conference (for example, a discussion of soap operas or politics during a video conference whose purpose is to plan a funeral for a child).

Figure 4:
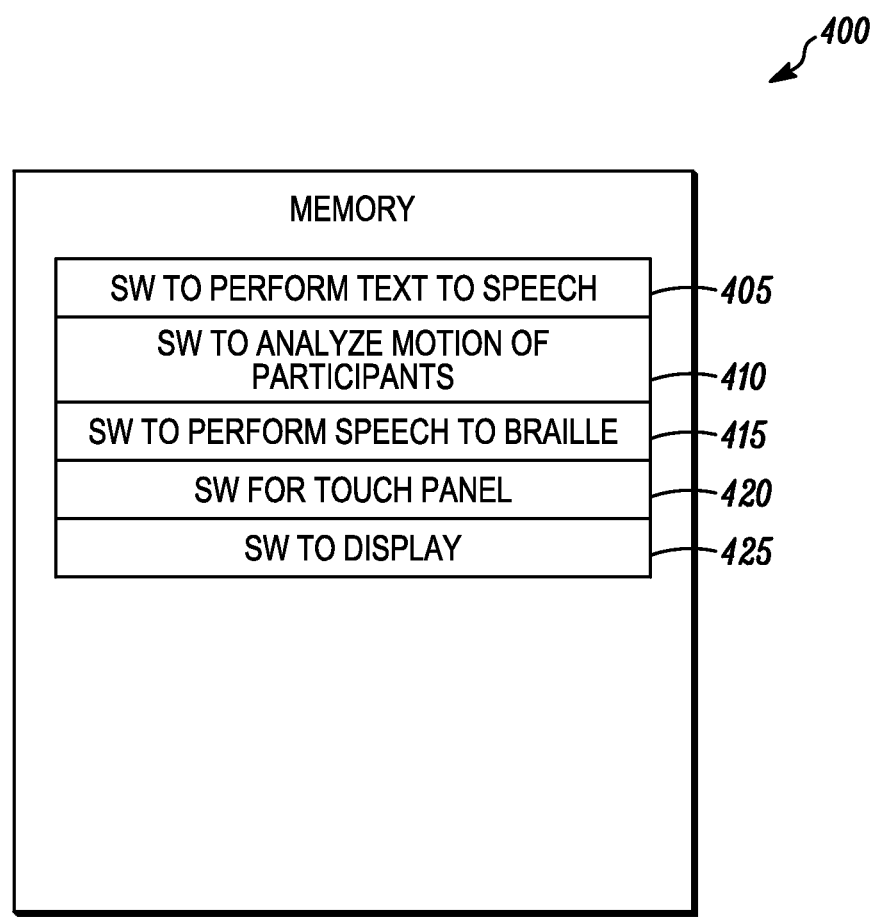
FIG. 4 is an exemplary block diagram of memory configuration.

FIG. 4 shows an exemplary block diagram of a memory configuration 400 for memory 270 in mobile computing device 200 as seen in FIG. 2. Memory configuration 400 can include data section 405 for performing text-to-speech conversions; data section 410 for analyzing motion associated with the video conference participants; data section 415 for performing speech-to-Braille conversions; data section 420 for receiving touchscreen input data (including pressure, length of touch, and rapidity of touch); and data section 425 for receiving information on the display 210 of the mobile computing device 200 (including brightness, heat generation, contrast, resolution, haptic feedback, and color saturation, for example).

Figure 5:
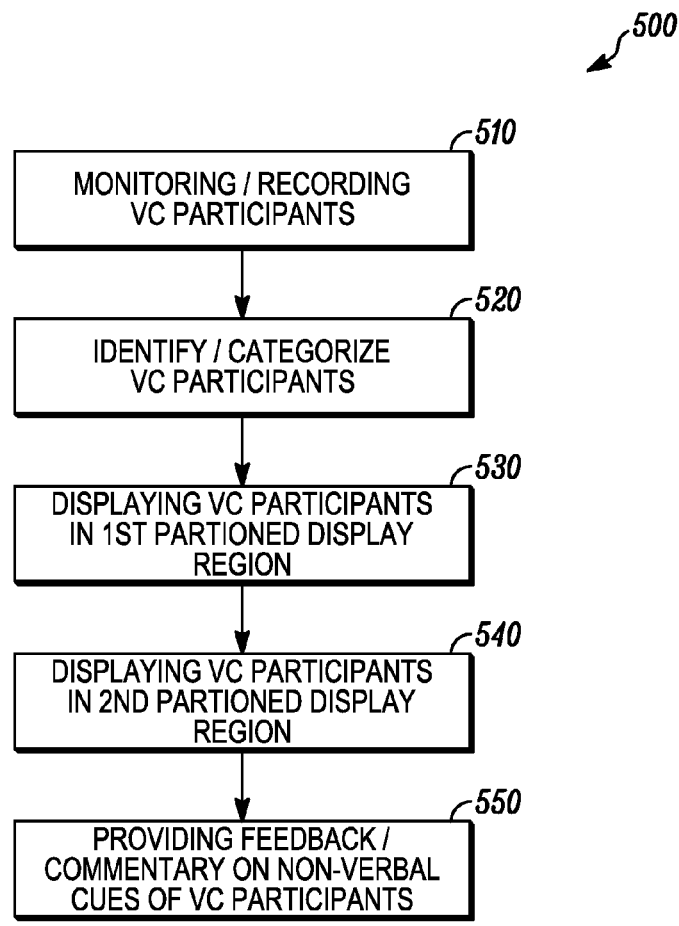
FIG. 5 is an exemplary flowchart.

FIG. 5 provides an exemplary flowchart of a method 500 for describing video conference participants (105, 110, 115, and 120) on a touchscreen display 200. Operation 510 monitors and records video conference participants. Thereafter, the video conference participants are identified and categorized, for example male participant, vice-president of Company X, and female participant, general counsel of Company Y.

Operation 530 enables the displaying of one set of video conference participants' images or representations (i.e., icon or avatars) in a first partitioned display region. Whereas, operation 540 enables the displaying of another set of video conference participants' images or representations (i.e., icon or avatars) in a second partitioned display region.

Operation 540 provides feedback or commentary on non-verbal cues of the video conference participants. The non-verbal cues can be motion of video conference participants (including hand waving, pointing, standing, or shifting in seat); body language (slouching, perspiring, fidgeting, and rigid posture); and facial expressions (smiling, frowning, involuntary ticks, winking, lip movement, temple throbbing, excessive swallowing, for example). All of these non-verbal cues can be commented upon or fed back to a limited sighted person via Braille, large format text, or audio.

Figure 6:
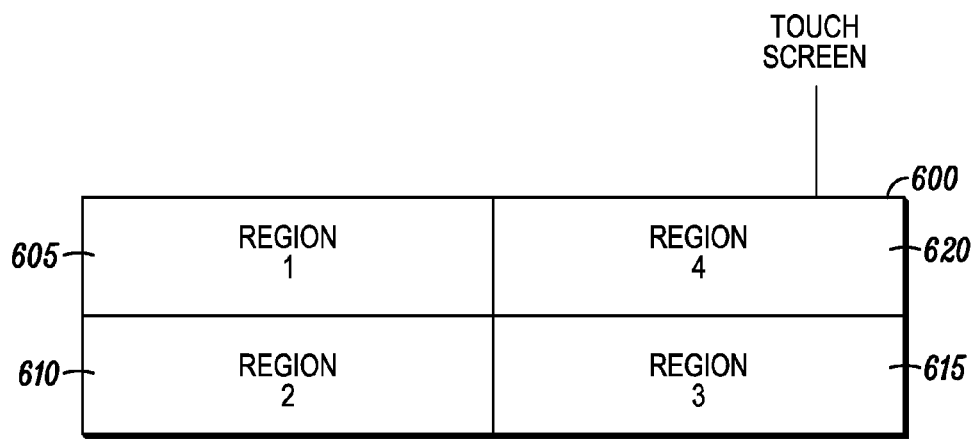
FIG. 6 is another exemplary schematic of a partitioned display of a mobile computing device.

FIG. 6 shows another exemplary schematic of a partitioned display 600 of a mobile computing device 200 to indicate that other equivalent forms of partitioning a display and providing feedback information upon the display have been contemplated. In partitioned display 600, region 605 displays local video conference participants or representations of local participants (i.e., icons, or avatars) and information about local participants, including title, gender, statue, pro/con/neutral position relative to presentation materials, etc. Region 610 displays remote video conference participants or representations of remote participants (i.e., icons, or avatars) and information about remote participants, including title, gender, statue, pro/con/neutral position relative to presentation materials, etc. Region 615 of partitioned display 600 provides audio information from the video conference, including ambient audio, video conference speakers' speech, and audio associated with any presentation, such as Microsoft's Powerpoint™ audio. Region 620 provides feedback on non-audio information from the video conference, including non-verbal cues associate with each local video conference participant, room décor, external weather information, and presentation or document imaging, for example. These described regions can be altered and may change dynamically based on a user's personal aesthetic appreciation or need for specific information.

Additionally, the regions of the partitioned display may be further sub-divided in a one-to-one correspondence with the number of speakers speaking at one time. For example, the third region can be split into two display windows when two video conference participants are speaking to one another. The regions may also be sub-divided if remote video conference participants are in multiple locations.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic device comprising:
   a touchscreen display configured to display one or more video conference participant representations in a first region of the touchscreen display, wherein the first region includes an area for displaying a speaking video conference participant, and wherein the area is split into two display windows when two video conference participants are speaking to one another;
   a haptics feedback system integrated into the touchscreen display and providing information regarding a video conference participant responsive to receiving a touch input at a location of the touchscreen display corresponding to the video conference participant's representation displayed on the touchscreen display;
   a speech-to-text controller for converting video conference participants' speech into text and creating an identification tag for each video conference participant; and
   an ongoing commentary controller that provides feedback on non-verbal cues about the video conference participants,
   wherein the haptics feedback system is configured to, responsive to receiving a touch input at a location of the touchscreen display corresponding to a second region of the touchscreen display, provide the feedback on non-verbal cues about the video conference participants in the second region of the touchscreen display, wherein the feedback is provided by audio or Braille tags.

2. The electronic device according to claim 1 further comprising a means for prioritizing the non-verbal cues feedback.

3. The electronic device according to claim 1, wherein the touchscreen display is configured to display local video conference participants in a third region of the touchscreen display, and wherein the touchscreen display is configured to display non-local video conference participants in a fourth region of the touchscreen display.

4. The electronic device according to claim 3, wherein the second region displays commentary on non-verbal cues corresponding to speaking video conference participants and non-speaking video conference participants.

5. A method comprising:
   monitoring and recording video conference participants as they join a video conference;
   identifying and categorizing the video conference participants to generate identification and category information for each of the video conference participants;
   displaying the identified and categorized video conference participants within a first region of a touchscreen display;
   displaying the identification and category information regarding a first video conference participant responsive to receiving a touch input at a location of the touchscreen display corresponding to the first video conference participant's representation displayed on the touchscreen display;
   displaying the video conference participants' conversation within a second region of the touchscreen display, wherein the second region is divided when at least two of the video conference participants are speaking to one another; and responsive to receiving a touch input at a location of the touchscreen display corresponding to a third region of the touchscreen display, displaying, via audio or Braille tags, feedback and commentary on non-verbal cues of the first video conference participant.

6. The method according to claim 5, further comprising prioritizing the feedback and commentary on the non-verbal cues of the first video conference participant.

7. The method according to claim 5, further comprising displaying commentary on non-verbal cues corresponding to speaking video conference participants and non-speaking video conference participants.

8. A non-transitory machine readable storage device, having stored thereon a computer program that includes a plurality of code sections comprising:
   code for monitoring and recording video conference participants as they join a video conference;
   code for identifying and categorizing the video conference participants to generate identification and category information for each of the video conference participants;
   code for displaying the identified and categorized video conference participants within a first region of a touchscreen display;
   code for displaying the identification and category information regarding a first video conference participant responsive to receiving a touch input at a location of the touchscreen display corresponding to the first video conference participant's representation displayed on the touchscreen display;
   code for displaying the video conference participants' conversation within a second region of the touchscreen display, wherein the second region is divided when at least two of the video conference participants are speaking to one another; and
   code for, responsive to receiving a touch input at a location of the touchscreen display corresponding to a third region of the touchscreen display, displaying, via audio or Braille tags, feedback and commentary on non-verbal cues of the first video conference participant.

9. The non-transitory machine readable storage device claimed in claim 8, further comprising:
   code for prioritizing the feedback and commentary on the non-verbal cues of the first video conference participant.

10. The non-transitory machine readable storage device claimed in claim 8, further comprising:
   code for displaying commentary on non-verbal cues corresponding to speaking video conference participants and non-speaking video conference participants.

11. The electronic device according to claim 1, wherein the information regarding a video conference participant comprises one or more of the identification tag, a title, gender, stature, or pro/con/neutral position relative to presentation materials.

12. The method according to claim 5, wherein the identification and category information for a respective video conference participant comprises one or more of an identification tag, a title, gender, stature, or pro/con/neutral position relative to presentation materials.

13. The non-transitory machine readable storage device claimed in claim 8, wherein the identification and category information for a respective video conference participant comprises one or more of an identification tag, a title, gender, stature, or pro/con/neutral position relative to presentation materials.

* * * * *